(12) United States Patent
D'Silva et al.

(10) Patent No.: US 7,803,078 B2
(45) Date of Patent: Sep. 28, 2010

(54) TENSIONER

(75) Inventors: Alben D'Silva, Windsor (CA); John Harvey, Novi, MI (US); Oliver Stegelmann, Strathroy (CA)

(73) Assignee: The Gates Corporation, Denver, CO (US)

( * ) Notice: Subject to any disclaimer, the term of this patent is extended or adjusted under 35 U.S.C. 154(b) by 258 days.

(21) Appl. No.: 12/077,656

(22) Filed: Mar. 20, 2008

(65) Prior Publication Data

US 2009/0239696 A1  Sep. 24, 2009

(51) Int. Cl.
*F16H 7/22* (2006.01)
*F16H 7/12* (2006.01)

(52) U.S. Cl. .................. 474/117; 474/112; 474/113; 474/133

(58) Field of Classification Search .......... 474/101, 474/109, 110, 112, 117, 135
See application file for complete search history.

(56) References Cited

U.S. PATENT DOCUMENTS

| | | | |
|---|---|---|---|
| 4,392,840 A | | 7/1983 | Radocaj .................. 474/117 |
| 4,473,362 A | * | 9/1984 | Thomey et al. ............ 474/135 |
| 4,816,011 A | * | 3/1989 | Kotzab .................. 474/111 |
| 4,822,322 A | * | 4/1989 | Martin .................. 474/135 |
| 4,824,421 A | | 4/1989 | Komorowski ............. 474/135 |
| 4,826,471 A | * | 5/1989 | Ushio .................... 474/135 |
| 4,834,694 A | * | 5/1989 | Martin .................. 474/135 |
| 4,878,885 A | * | 11/1989 | Brandenstein et al. ....... 474/135 |
| 4,886,484 A | | 12/1989 | Hanes ................... 474/135 |
| 4,983,145 A | | 1/1991 | Hirai et al. ............. 474/117 |
| 5,169,368 A | * | 12/1992 | Quintus et al. ............ 474/135 |
| 5,236,396 A | * | 8/1993 | Golovatai-Schmidt et al. ... 474/101 |
| 5,348,514 A | * | 9/1994 | Foley .................... 474/135 |
| 5,407,397 A | * | 4/1995 | Foley .................... 474/135 |
| 5,458,541 A | * | 10/1995 | Adler et al. .............. 474/135 |
| 5,599,245 A | * | 2/1997 | Giese .................... 474/135 |
| 5,620,385 A | * | 4/1997 | Cascionale et al. .......... 474/112 |
| 5,638,931 A | | 6/1997 | Kerr ...................... 192/45 |
| 5,795,257 A | * | 8/1998 | Giese et al. .............. 474/109 |
| 5,803,850 A | * | 9/1998 | Hong et al. .............. 474/135 |

(Continued)

FOREIGN PATENT DOCUMENTS

DE    37 18 227 A1   12/1988

(Continued)

OTHER PUBLICATIONS

Notification of Transmittal of the International Search Report and the Written Opinion of the International Searching Authority, or the Declaration, International Application No. PCT/US2009/001675 Mailed May 20, 2009.

*Primary Examiner*—John Q Nguyen
*Assistant Examiner*—Henry Liu
(74) *Attorney, Agent, or Firm*—J. A. Thurnau, Esq.; J. L. Mahurin, Esq.; P. N. Dunlap, Esq.

(57) ABSTRACT

A tensioner comprising a base, a pivot arm pivotally engaged with the base, a torsion spring engaged between the base and the pivot arm for biasing the pivot arm, a first damping member and a second damping member disposed between the pivot arm and the base, the first damping member wedgingly engagable between the pivot arm and the second damping member, and the second damping member frictionally engaged between the first damping member and the base.

3 Claims, 3 Drawing Sheets

U.S. PATENT DOCUMENTS

| | | | |
|---|---|---|---|
| 6,129,189 A | 10/2000 | Kerr | 192/45 |
| 6,231,465 B1 * | 5/2001 | Quintus | 474/133 |
| 6,575,860 B2 * | 6/2003 | Dutil | 474/135 |
| 6,682,452 B2 * | 1/2004 | Quintus | 474/135 |
| 6,855,079 B2 * | 2/2005 | Cura et al. | 474/135 |
| 6,863,631 B2 * | 3/2005 | Meckstroth et al. | 474/135 |
| 7,004,865 B2 * | 2/2006 | Berndt et al. | 474/135 |
| 7,144,344 B2 * | 12/2006 | Konanz | 474/117 |
| 7,186,196 B2 * | 3/2007 | Quintus | 474/135 |
| 7,267,626 B2 * | 9/2007 | Kawasaki et al. | 474/135 |
| 7,273,432 B2 * | 9/2007 | Schonmeier et al. | 474/135 |
| 2004/0014542 A1 * | 1/2004 | Quintus | 474/135 |
| 2007/0142148 A1 * | 6/2007 | Joslyn et al. | 474/135 |

FOREIGN PATENT DOCUMENTS

| | | |
|---|---|---|
| DE | 41 25 494 C1 | 11/1992 |
| DE | 10 2005 059 576 A1 | 6/2007 |

* cited by examiner

TENSIONER

FIELD OF THE INVENTION

The invention relates to a tensioner, and more particularly, to a tensioner comprising a first damping member wedgingly engagable between a pivot arm and a second damping member.

BACKGROUND OF THE INVENTION

In the automobile industry it is common to operate various vehicle accessories, such as the power steering pump, oil and air pumps, air conditioning and alternator, by a single endless belt driven by a pulley connected to the engine crankshaft. This system is referred to as a serpentine drive belt system. To ensure optimum operating efficiency for these various accessories, it is necessary that the drive belt be maintained at a predetermined tension to assure efficient performance of the accessories as well as satisfactory service life for the belt. Due to the relatively greater length for the single drive belt which replaces a plurality of smaller belts, there is a greater tendency for the belt to stretch which will affect the operating characteristics of the driven accessories. Therefore, it is desirable that a belt tensioning device be used for these endless belts to provide reliable service over an extended period of time and to maintain a constant amount of tension thereon regardless of the amount of belt stretch.

Numerous devices have been proposed and used to accomplish this purpose. One type of tensioner uses a bushing formed of an elastomeric material which is placed in compression by some mechanical means for continuously exerting a tensioning force on the belt. These tensioner constructions, which use an elastomeric material, have the disadvantages in that the high load rate which they exert on the belt results in the rapid loss of tensioning as the belt stretches, and this load rate limits the stroke of the belt-engaged idler pulley to a shorter distance than desired. Also, sudden acceleration and deceleration of the drive belt can cause a whipping action to occur which creates a time lag before full damping is achieved.

Other types of tensioning devices and arrangements are provided with some type of mechanical retaining means which limits the movement of the belt tensioning member in an opposite nontensioning direction, thereby maintaining a constant tensioning force on the endless drive belt and eliminating the undesirable effects of belt whipping.

Representative of the art is U.S. Pat. No. 4,392,840 (1983) to Radocaj which discloses a device which maintains a predetermined tensioning force on the endless drive belt for vehicle accessories by use of a one-way clutch which prevents return of the tensioning means from its forward most tensioning position. In the preferred embodiment, a cylindrical shaft is mounted in a fixed position adjacent the drive belt. A roller clutch assembly is mounted on the shaft and includes an outer clutch housing rotatably mounted on the shaft. An outwardly extending lever is attached to the clutch housing and has an idler pulley rotatably mounted on the extended end of the lever. The pulley is moved into tensioning engagement with the drive belt by a torsional spring which is telescopically mounted on the shaft and clutch housing. The spring moves the pulley in a belt tensioning direction. The one-way clutch assembly preferably includes a roller clutch which consists of a plurality of rollers which are interposed between and are biased by a plurality of leaf springs into a wedging relationship with the shaft surface and ramps formed on a bearing cup. The rollers permit free movement of the clutch housing and attached lever in the belt tensioning direction while preventing movement of these components and associated idler pulley in the opposite nontensioning direction because of the wedging action of the rollers.

What is needed is a tensioner comprising a first damping member wedgingly engagable between a pivot arm and a second damping member. The present invention meets this need.

SUMMARY OF THE INVENTION

The primary aspect of the invention is to provide a tensioner comprising a first damping member wedgingly engagable between a pivot arm and a second damping member.

Other aspects of the invention will be pointed out or made obvious by the following description of the invention and the accompanying drawings.

The invention comprises a tensioner comprising a base, a pivot arm pivotally engaged with the base, a torsion spring engaged between the base and the pivot arm for biasing the pivot arm, a first damping member and a second damping member disposed between the pivot arm and the base, the first damping member wedgingly engagable between the pivot arm and the second damping member, and the second damping member frictionally engaged between the first damping member and the base.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
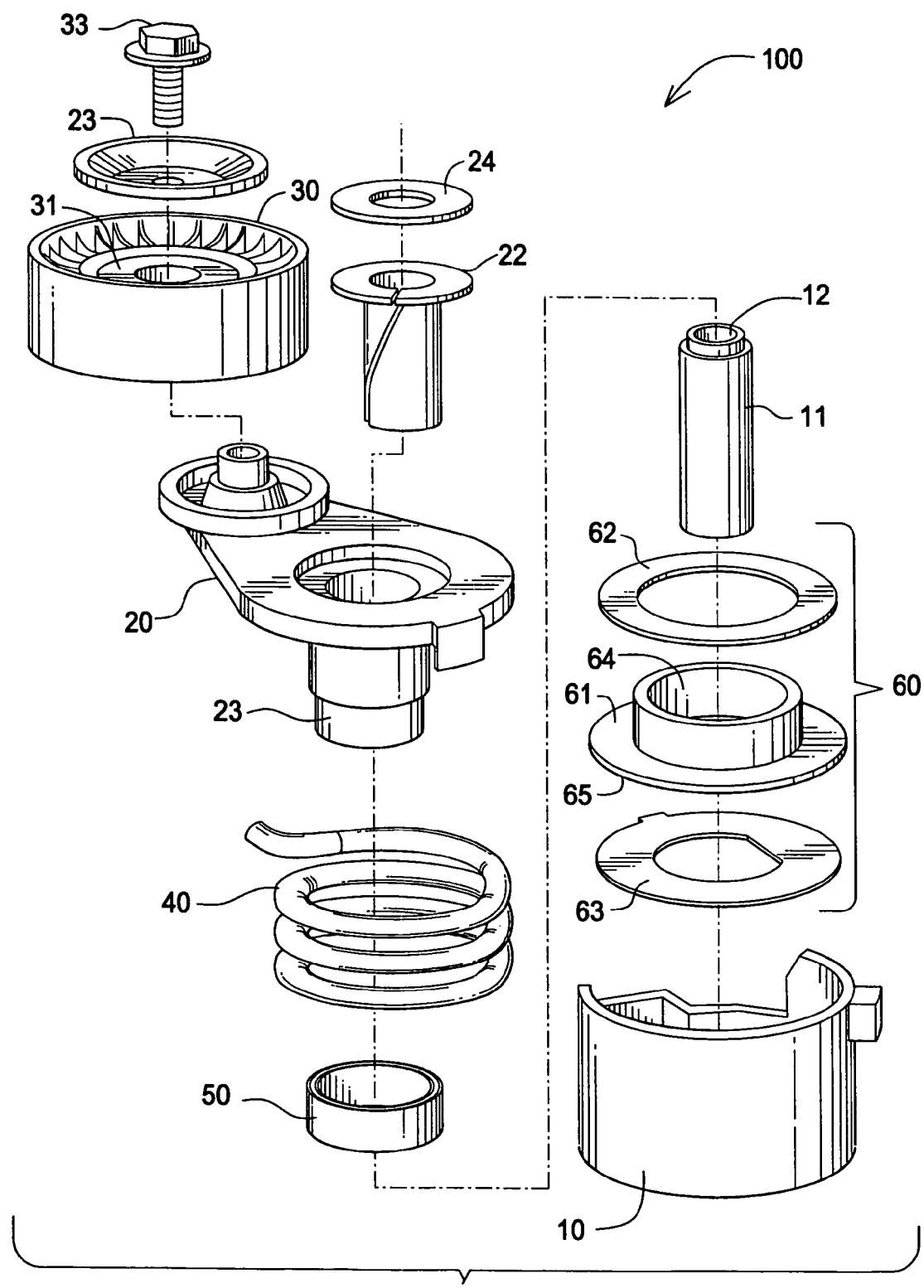
FIG. 1 is an exploded view of the tensioner.

FIG. 1 is an exploded view of the tensioner. Tensioner 100 comprises a base 10. Pivot arm 20 is pivotally engaged with base 10 through shaft 11. Pivot bushing 22 reduces friction between the pivot arm 20 and shaft 11, thereby facilitating pivotal movement. Seal plate 24 prevents debris from entering between bushing 22 and shaft 11 or pivot arm 20 and provides pivot arm location and retention against the axial force of the spring.

Pulley 30 is journalled to pivot arm 20 through a bearing 31. Dust shield 32 prevents debris from coming in contact with bearing 31. Bearing 31 and thereby pulley 30 are fastened to pivot arm 20 by a bolt 33. Bearing 31 comprises either a ball bearing, sleeve bearing, needle bearing or other suitable bearing known in the art.

Torsion spring 40 is engaged between base 10 and pivot arm 20. Torsion spring 40 is used to apply a spring force through pivot arm 20 to a belt (not shown) through pulley 30.

Tensioner 100 further comprises a first damper 50 and a second damper 60. First damper 50 engages a surface 23 of pivot arm 20. Damper 50 is described in FIG. 2 and FIG. 3.

Second damper 60 comprises a damper support 61, a first damper friction portion 62 and a second damper friction portion 63. Portion 63 is keyed to base 10 so that portion 63 does not rotate with respect to base 10. Support 61 comprises a flange 65 which extends radially. Portion 62 and 63 frictionally engage flange 65. First damper 50 also engages an inner surface 64 of damper support 61.

Torsion spring 40 applies an axial force to press portion 62 against flange 65 of support 61. In turn, flange 65 presses portion 63 against base 10.

The tensioner is mounted to a mounting surface (not shown), such as an engine, by a fastener such as a bolt engaged through bore 12 of shaft 11.

Figure 2:
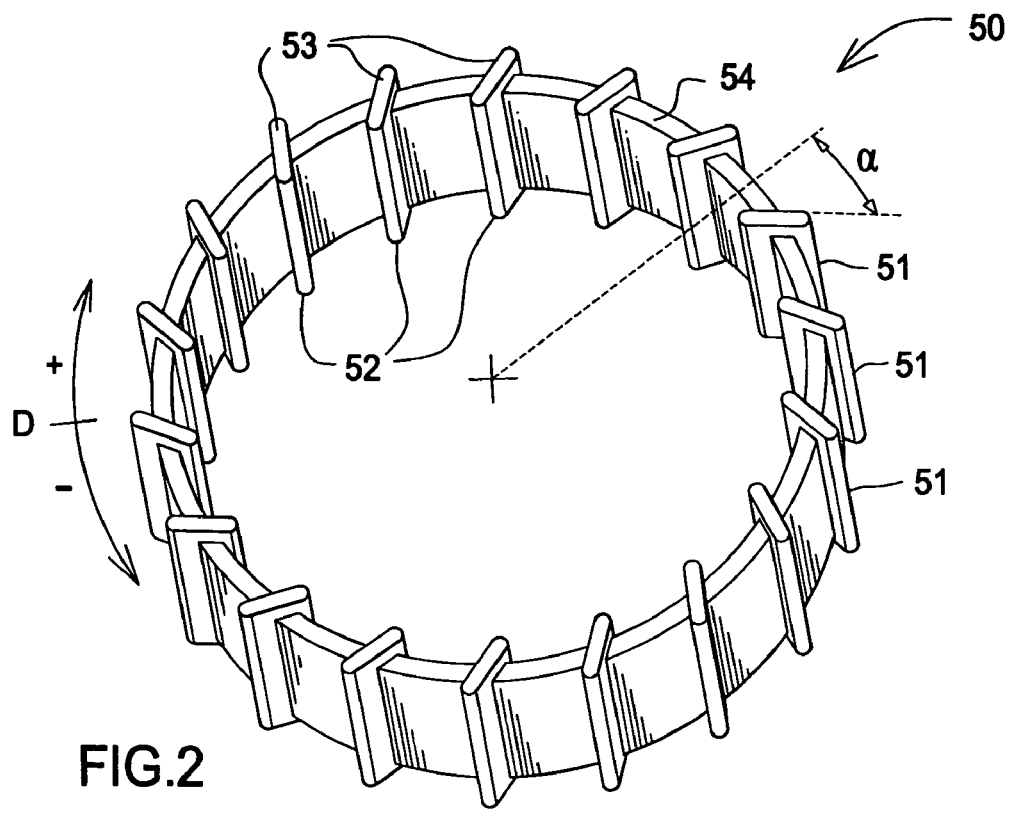
FIG. 2 is a perspective view of the first damping member.

FIG. 2 is a perspective view of the first damping member. Damping member 50 comprises a plurality of planar members 53 disposed around the circumference of ring 54. In an alternate embodiment members 53 need not be planar, but instead may have any form which allows contact with surface 23 and 64. Each planar member 53 comprises a surface 51 and a second surface 52. Surface 51 engages surface 64. Surface 52 engages surface 23.

Each planar member 53 is further disposed at an angle $\alpha$ with respect to a radial drawn from the center of ring 54. Since it is a part of pivot arm 20, surface 23 is rotationally moveable with respect to support 61. Due to the angle ($\alpha$) when the pivot arm rotates in direction D+, since member 53 is engaged with each surface 23 and 64 such that each member 53 partially rotates with respect to ring 54. This causes each member 53 to wedge between each surface 23 and 64 such that further relative rotation of pivot arm 20 with respect to support 61 is prevented. This in turn causes support 61 to be rotated between damping portions 62 and 63. Due to the normal force imparted by torsion spring 40 upon damping member 60, the frictional forces between damping portions 62 and 63 and support 61 resist rotational movement of pivot arm 20, thereby damping a movement of pivot arm 20.

A movement of pivot arm 20 in direction (D−) causes members 53 to disengage from surfaces 23 and 64, thereby disengaging the pivot arm 20 from the damping effect of damping member 60.

Angle ($\alpha$) is in the range of approximately 25° to approximately 65°. Angle ($\alpha$) is determined with respect to a point on a radius (R) located at a distance of ⅓(R) from the ring 54.

Figure 3:
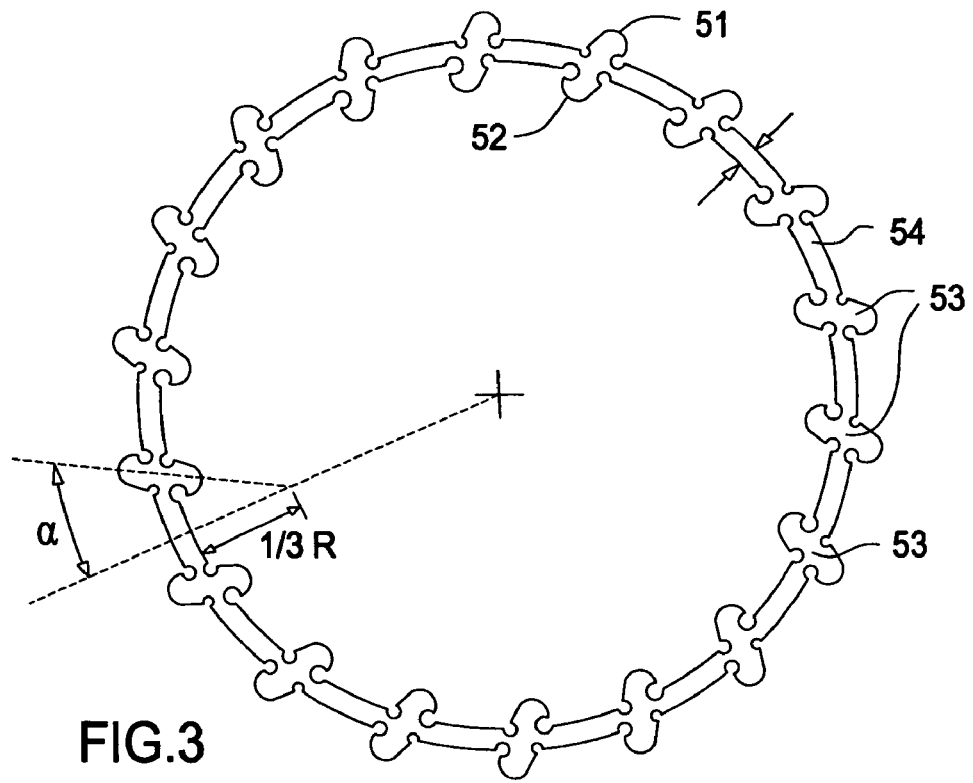
FIG. 3 is a plan view of the damping member in FIG. 2.

FIG. 3 is a plan view of the damping member in FIG. 2. A plurality of members 53 are spaced about the circumference of ring 54. Damping member 50 comprises an elastomeric material. Damping member 50 may be molded, cast or cut as a single part. Due to its inherent flexibility, elastomeric materials allow each member 53 to flex or pivot with respect to ring 54 during operation as each member 53 wedges between each surface 23 and 64.

Figure 4:
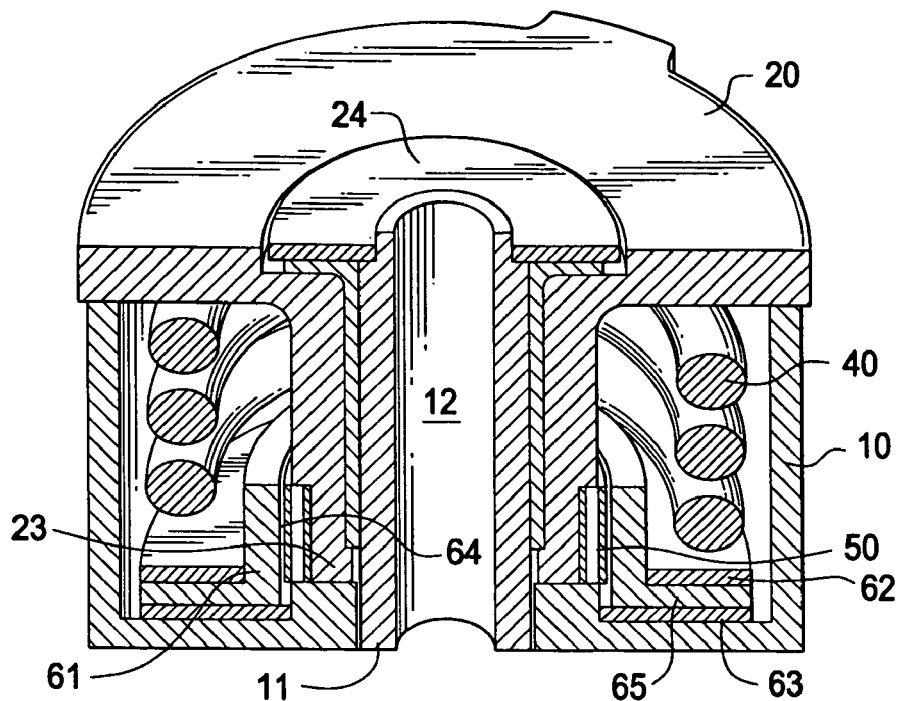
FIG. 4 is a cross-sectional view of the tensioner.

FIG. 4 is a cross-sectional view of the tensioner. Damper 50 is disposed between support 61 and surface 23. Shaft 11 is fixedly connected to base 10.

Figure 5:
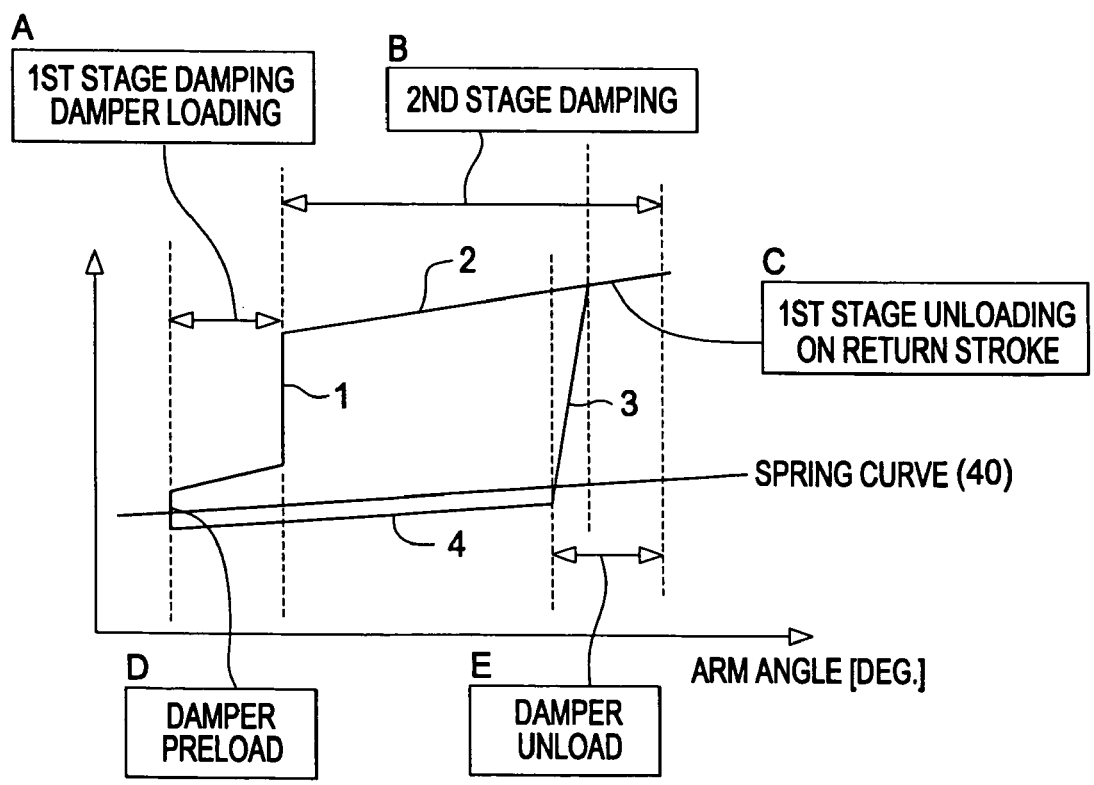
FIG. 5 is a graph showing a comparison between load and arm angle.

FIG. 5 is a graph showing a comparison between load and arm angle. The graph describes relative values for load and arm travel and therefore does not include specific numerical values or ranges.

In section (A), the first damper 50 is being loaded as a result of rotation of pivot arm 20 in direction D+. This is also characterized as $1^{st}$ stage damping. As arm angle increases the belt load gradually increases until damping member 50 begins wedging between surface 23 and 64. This is represented by the vertical line (1).

In section (B), $2^{nd}$ stage damping occurs as represented by line (2). This means that damping is being caused by friction between damping portions 62, 63 and support 61. This is the result of damping member 50 being fully wedged between surface 23 and 64. Wedged engagement between first damper 50, surface 23 and surface 64 forces support 61 to move between portions 62 and 63.

In section (C) damper member 50 "unloads" and thereby the damping caused by damping portions 62 and 63 is rapidly diminished since damper 50 is being disengaged. This is represented by line (3). In section (D) damper 50 is unloaded by the reverse rotation (D−) of pivot arm 20. Line (4) represents the tensioner fully unloading.

In section (E), damper 50 is preloaded, meaning surfaces 51 and 52 are engaged with and are just becoming wedged between surfaces 23 and 64. Some preload is required to avoid the situation where there is undesirable "free-play" between the loaded and unloaded conditions.

Although a form of the invention has been described herein, it will be obvious to those skilled in the art that variations may be made in the construction and relation of parts without departing from the spirit and scope of the invention described herein.

We claim:

1. A tensioner comprising:
   a base;
   a pivot arm pivotally engaged with the base;
   a torsion spring engaged between the base and the pivot arm for biasing the pivot arm;
   a first damping member and a second damping member disposed between the pivot arm and the base;
   the first damper comprising a ring with a plurality of planar members distributed around the circumference of the ring, each planar members engaged with the ring for a partial rotation thereon, each of the plurality of planar members having a first surface for frictionally engaging a pivot arm surface and an opposing second surface engagable with the second damping member;
   the second damping member comprising a radially extending flange frictionally engaged between a first portion surface and a second portion surface, the first portion surface fixed to the base;
   the torsion spring is in pressing engagement with the second damping member against the base; and
   the second damping member frictionally engaged between the first damping member and the base.

2. The tensioner as in claim 1, wherein the first damping member comprises an elastomeric material.

3. The tensioner as in claim 1, wherein:
   the planar members are disposed at an angle ($\alpha$) in the range of approximately 25° to approximately 65°; and
   angle ($\alpha$) is determined with respect to a point on a radius (R) located at a distance of ⅓R from the ring.

* * * * *